Figure 1:
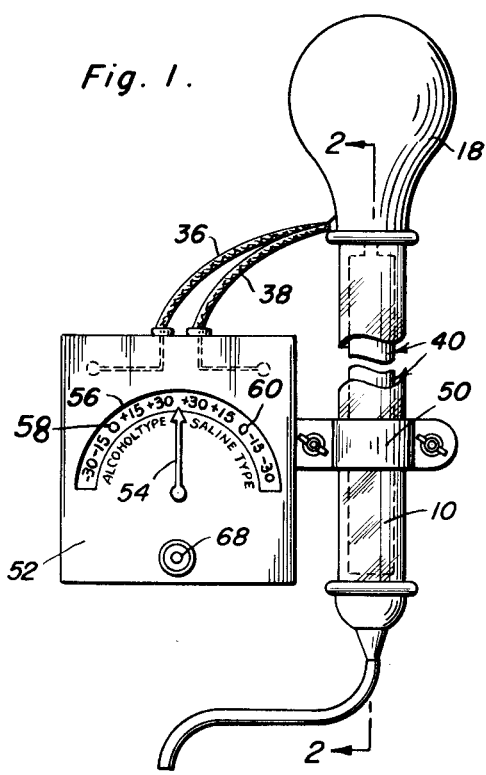

Feb. 6, 1951 P. F. BYRUM 2,540,425
ANTIFREEZE INDICATOR
Filed Feb. 20, 1948 2 Sheets—Sheet 1

Paul F. Byrum
INVENTOR.

BY *Clarence A. O'Brien*
*and Harvey B. Jacobson*
Attorneys

Feb. 6, 1951 P. F. BYRUM 2,540,425
ANTIFREEZE INDICATOR
Filed Feb. 20, 1948 2 Sheets-Sheet 2

Paul F. Byrum
INVENTOR.

Patented Feb. 6, 1951

2,540,425

UNITED STATES PATENT OFFICE 2,540,425

ANTIFREEZE INDICATOR

Paul F. Byrum, Memphis, Tenn.

Application February 20, 1948, Serial No. 9,913

6 Claims. (Cl. 175—183)

1

This invention relates to an anti-freeze indicator and has for its primary object accurately to indicate the amount of anti-freeze in a cooling liquid such as is employed in the cooling system of a conventional liquid-cooled internal combustion engine.

Another object is to compensate for the different temperatures attained by the cooling liquids in service.

A further object is to adapt the principles involved for use in a portable type of anti-freeze indicator, and also enable the device to be installed in a vehicle as a permanent part of the equipment thereof.

Among its features, this invention embodies an electrode in contact with the cooling liquid, the concentration of anti-freeze in which is to be measured, an electrode which is subject to deformation under varying temperature conditions immersed in the cooling liquid in spaced relation to the first-mentioned electrode, means to impress an electrical potential across the electrodes to create a flow of electrical energy through the cooling liquid, and means between one of the electrodes and the source of electrical potential to indicate the amount of current passing through the cooling liquid.

Other features include means to translate the readings of the indicating means into reading showing the temperature at which will freeze the cooling liquid containing different concentrations of anti-freeze, and a push button switch interposed in the electrical circuit to establish and discontinue the flow of current through the liquid.

Figure 2:
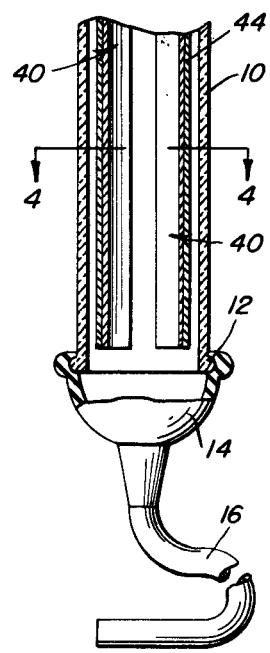
Figure 3:
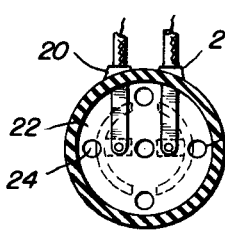
Figure 4:
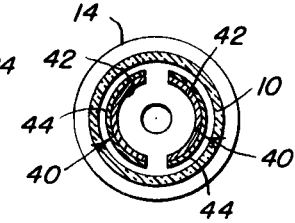
Figure 5:
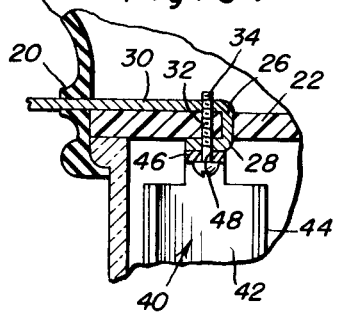
Figure 6:
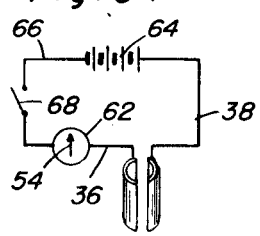
Figure 7:
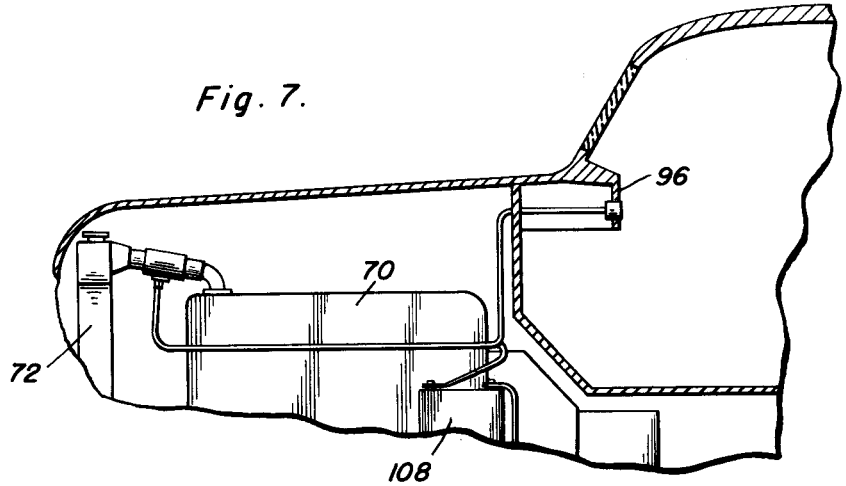

In the drawings,

Figure 1 is a side view of a portable type of anti-freeze indicator embodying the features of this invention, Figure 2 is a fragmentary enlarged sectional view taken substantially along the line 2—2 of Figure 1, Figure 3 is a horizontal sectional view taken substantially along the line 3—3 of Figure 2, Figure 4 is a fragmentary enlarged sectional view taken substantially along the line 4—4 of Figure 2, Figure 5 is a fragmentary enlarged detail view illustrating the leads by which the electrical energy is conveyed to the electrodes within the cylinder of the portable type anti-freeze indicator, Figure 6 is a wiring diagram of the portable type anti-freeze indicator, Figure 7 is a fragmentary sectional view

Figure 8:
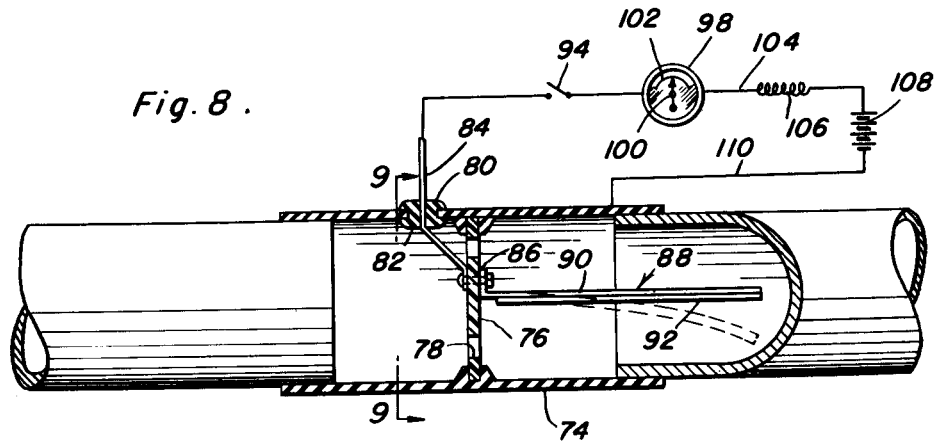
Figure 9:
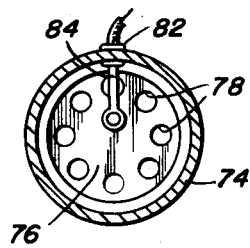

2 through the forward portion of a conventional motor vehicle illustrating the built-in type of anti-freeze indicator installed therein, Figure 8 is a fragmentary enlarged detail view through the cooling system attachment of my improved built-in type of indicator and illustrating diagrammatically the circuit which is employed in connection therewith, and Figure 9 is a sectional view taken substantially along the line 9—9 of Figure 8.

Referring to the drawings in detail in its preferred embodiment, my invention takes the form of the portable type of device illustrated in Figures 1 through 6, inclusive, and comprises a tubular body 10 of glass such as is conventionally employed in the hydrometer type of anti-freeze indicator. This tubular body 10 is equipped at opposite ends with outstanding beads 12, and coupled to one end of the tubular body by means of the bead 12 thereon is a coupling unit 14 to which a flexible hose 16 is attached through which the liquid to be tested is introduced into the tubular body 10.

The end of the tubular body 10 remote from that carrying the coupling 14 is provided with a flexible bulb 18 of the general type employed for the purpose of filling the tubes of conventional hydrometers with cooling fluid, but this bulb differs from the conventional bulb in that it is provided in one side with a pair of outwardly extending spaced parallel bosses 20 through which project the leads by which power is supplied to the electrodes to be more fully hereinafter described.

Fitted in the reduced neck of the bulb adjacent its connection with the tubular body 10 is a disk 22 of non-conducting material which is provided at radially spaced points with perforations 24 through which communication is established between the interior of the tube 10 and the bulb 18 so that when the bulb is collapsed, the air contained therein will be expelled through the tube and rubber hose 16 so that with the end of the hose 16 deposited in a reservoir containing the liquid to be tested and the bulb released, the liquid will be drawn up into the tube 10 under the influence of external air pressure. Formed at spaced points in the disk 22 are openings 26, through which the hooked ends 28 of a pair of spaced parallel conductors or leads 30 project. As shown, the hooked ends of the conductors or leads 30 are turned back upon themselves and pierced to receive a coupling bolt 32 which is threaded through an opening 34 in its respective lead, and serves to support an electrode in proper position within the tubular body 10. As shown, the conductors or leads 30 project laterally through the apertured bosses 20 to provide contacts to which the conductors 36 and 38 are connected.

Extending longitudinally in the tubular body 10, and in spaced parallel relation to one another are arcuate electrodes, designated generally 40, each of which comprises transversely curved strips 42 and 44 formed of metals having different expansion characteristics under heat. These sttrips are laid one upon the other and welded or otherwise fixed together to form bimetallic electrodes, the transverse curvature of which will change with fluctuations of temperature, so that when the liquid to be tested is introduced into the tube 10, the adjacent edges of the electrodes 40 will move further away from one another or closer to one another, according to the temperature of the liquid, and thereby lengthen or shorten the path between the edges of the electrodes. The upper ends of the strips 42 are provided with angularly extending ears 46 which are pierced, as at 48 (Fig. 5) to receive the bolt 32 previously referred to so as to rigidly support the electrodes on the plate 22. In this manner the electrodes 40 are supported in spaced parallel relation within the tube 10, and will be free to expand or contract with the temperature of the liquid introduced into the tube 10 in order to move their adjacent edges toward or away from one another in accordance with the temperature of the liquid.

Clamped about the tube 10 intermediate its ends is a clamp bracket 50 upon which is supported a case or housing 52. This housing encloses an electrical measuring instrument such as a galvanometer, the hand 54 of which operates over the face of the housing 52 in conjunction with a dial 56 which is calibrated with two different scales 58 and 60, one of which is used for determining the concentration of anti-freeze of the alcohol type, while the other is employed when an anti-freeze of the salt type is employed. The galvanometer is designated 62 in Figure 6 and coupled to one terminal thereof is one terminal of the conductor 36. The housing 52 also encloses a source of electrical energy 64, such as a pair of dry cells, one terminal of which source is connected to the conductor 38, while the opposite terminal is connected to a conductor 66 which leads through a conventional push button switch 68 to the opposite terminal of the galvanometer 62. The push button of the switch 68 projects through the front of the housing 52 as illustrated in Figure 1 so that when the liquid to be tested has been introduced into the barrel or tubular body 10, pressure may be applied to the push button switch to close the circuit and energize the electrodes, so that the galvanometer hand 54 will move across the dial 56, and indicate the concentration of anti-freeze in the cooling liquid. The graduations on the dial 56 are preferably such as to indicate the temperature at which the cooling liquid being tested will freeze.

Owing to the fact that saline cooling solutions possess a greater degree of conductivity as the concentration of salt is increased, the position of the hand 54 on the dial 60 will indicate the amount of protection afforded by the salts contained in the cooling liquid. With the alcohol type of anti-freeze, the conductivity of the cooling liquid decreases, and hence the graduations 58 on the dial 56 will give an indication of the concentration of anti-freeze in the cooling liquid.

Owing to the fact that the conductivity of the liquid coolant varies with its temperature, the bimetallic electrodes 40 will serve to compensate for differences in the temperature of the different cooling liquids at the time of the test, automatically increasing or decreasing the distance that the electrical current from the source 64 has to travel through the liquid between the edges of the electrodes, and hence by employing bimetallic electrodes compensation for the differences in temperature of the cooling liquid is effected, resulting in accuracy of the reading of the instrument.

In the modified form of the invention illustrated in Figures 7 through 9, inclusive, I introduce into the cooling system of the internal combustion engine preferably between the discharge outlet of the motor block 70 and the radiator 72 a tubular conduit 74 through which the cooling liquid is conducted from the motor block to the radiator. Mounted within this tubular conduit in any suitable manner is a disk 76 which is provided with a group of perforations 78 to allow the free flow of the cooling liquid through the system. The conduit 74 is preferably of a conducting material, and is provided with a radial aperture 80 for the reception of an insulating and water-tight grommet 82 through which a conductor 84 is introduced into the conduit 74. This conductor 84 is electrically coupled to a supporting ear 86 for a bimetallic electrode 88 formed of strips 90 and 92 of metal of different characteristics so that the electrode 88 will deform and bend toward or away from the tubular body 74 with fluctuations of temperature in the cooling liquid passing through the device. The conductor 84 leads through a conventional push button switch 94 which is preferably mounted on the instrument board 96 of the vehicle, and from the push button switch 94 the conductor 84 leads to a galvanometer 98 which is preferably mounted on the instrument board 96 adjacent the push button switch 94. The galvanometer 98 like that previously described is equipped with a hand 100 which moves over a dial 102 graduated to indicate the concentration of anti-freeze in the cooling liquid, and coupled to the terminal of the galvanometer 98 opposite that to which the conductor 84 is connected is a conductor 104 which leads through a suitable resistor or choke coil 106 to one terminal of the battery 108 employed in the starting and lighting system of the vehicle. The opposite terminal of the battery is connected through a conductor 110 to the tubular conduit 74 so that the latter will serve as an electrode which cooperates with the electrode 88 previously referred to.

In use, when it is desired to test the concentration of anti-freeze in the cooling liquid contained in the cooling system of the motor vehicle in which this device has been installed, it is only necessary to exert pressure on the push button of the push button switch 94, thereby to close the circuit through the apparatus, and establish a flow of electrical current between the electrodes 88 and 74. The resistance offered to the flow of the current by the fluid passing through the electrode 74 will be measured on the galvanometer 98 so that the user may, by merely touching the button of the push button switch 94, ascertain the protection afforded by the anti-freeze without leaving the driver's seat of the vehicle. Obviously, due to the fact that the electrode 88 is of a bimetallic nature, it is obvious that as the temperature of the cooling liquid increases or decreases, it will bend toward or away from the electrode 74 according to the thermal conditions of the cooling liquid so as to compensate for the differences of conductivity of the cooling liquid occasioned by temperature change. In this way, an accurate determination of the concentration of anti-freeze in the cooling liquid may be obtained.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. Apparatus for determining the concentration of an anti-freeze in cooling liquid which includes a tubular electrode in contact with said liquid, an elongated electrode which is subject to deformation under varying temperature conditions disposed within the tubular electrode and immersed in the cooling liquid and extending substantially longitudinally of and in spaced relation to the first-mentioned electrode, means to impress an electrical potential across on the electrodes to create a flow of electrical energy through the cooling liquid and means between one of the electrodes and the source of electrical potential to indicate the amount of current passing through the cooling liquid.

2. Apparatus for determining the concentration of an anti-free in cooling liquid which includes a tubular electrode in contact with said liquid, an elongated electrode which is subject to deformation under varying temperature conditions disposed within the tubular electrode and immersed in the cooling liquid and extending substantially longitudinally of and in spaced relation to the first-mentioned electrode, means to impress an electrical potential across on the electrodes to create a flow of electrical energy through the cooling liquid, means between one of the electrodes and the source of electrical potential to indicate the amount of current passing through the cooling liquid, and means to translate the readings of the indicating means into readings showing the temperature at which will freeze the cooling liquid containing different concentrations of anti-freeze.

3. Apparatus for determining the concentration of anti-freeze in cooling liquid including a pair of electrodes in the reservoir in contact with the liquid, one of the electrodes being tubular and the other electrode being disposed within the tubular electrode and being subject to deformation according to variations in the temperature of the liquid within the reservoir, means to impress an electrical potential across said electrodes to create a flow of electrical energy through the liquid and means between one of the electrodes and the source of electrical energy to indicate the amount of current passing through the liquid.

4. In apparatus for determining the concentration of anti-freeze in coolant fluid, a tubular electrode comprising a conduit for the coolant, an elongated bi-metallic electrode within said tubular electrode and extending substantially longitudinally thereof in spaced relation thereto, and a support within said tubular electrode for one end of said elongated electrode.

5. Apparatus according to claim 4, and wherein said support is an apertured disc rigidly secured transversely of the tubular electrode.

6. The combination of a hose connection in the cooling system of an automobile with apparatus for determining the concentration of anti-freeze in coolant fluid, a tubular electrode comprising a conduit for the coolant, an elongated bi-metallic electrode within said tubular electrode and extending substantially longitudinally thereof in spaced relation thereto, and a support within said tubular electrode for one end of said elongated electrode, said tubular electrode being connected with said hose connection.

PAUL F. BYRUM.

REFERENCES CITED

The following references are of record in the file of this patent:

UNITED STATES PATENTS

| Number | Name | Date |
| --- | --- | --- |
| 1,320,036 | Crockatt | Oct. 28, 1919 |
| 1,518,211 | Maue | Dec. 9, 1924 |
| 1,826,886 | Keeler | Oct. 13, 1931 |
| 1,874,911 | Crosthwait | Aug. 30, 1932 |
| 2,211,394 | Vogel | Aug. 13, 1940 |
| 2,340,641 | Cameron | Feb. 1, 1944 |